United States Patent [19]

Kraus et al.

[11] Patent Number: 5,209,938
[45] Date of Patent: May 11, 1993

[54] METHOD FOR RETARDING STALING OF BAKED GOODS

[75] Inventors: J. Kevin Kraus, Tenafly, N.J.; Ronald E. Hebeda, Naperville, Ill.

[73] Assignee: CPC International Inc., Englewood Cliffs, N.J.

[21] Appl. No.: 406,657

[22] Filed: Sep. 13, 1989

[51] Int. Cl.$^5$ ............................................. A21D 8/04
[52] U.S. Cl. ...................................................... 426/20
[58] Field of Search ......................................... 426/20

[56] References Cited

U.S. PATENT DOCUMENTS

| | | | |
|---|---|---|---|
| 2,615,810 | 10/1952 | Stone | 426/20 |
| 2,665,215 | 1/1954 | Gray. | |
| 4,299,848 | 11/1981 | DeStefanis et al. | |
| 4,416,903 | 11/1983 | Cole | 426/20 X |
| 4,469,791 | 9/1984 | Colson, et al. | |
| 4,654,216 | 3/1987 | Carrell, et al. | |
| 4,806,426 | 2/1989 | Colson, et al. | |

FOREIGN PATENT DOCUMENTS

| | | |
|---|---|---|
| 980703 | 12/1975 | Canada. |
| 2052572 | 5/1972 | Fed. Rep. of Germany. |
| 2205984 | 8/1973 | Fed. Rep. of Germany. |

OTHER PUBLICATIONS

Hansen, "Industrial Application Possibilities for an Acid Stable Alpha-Amylase from Aspergillus Niger", New Approaches to Research on Cereal Carbohydrates, pp. 211–216 (Elsevier Science Publishers, Amsterdam, 1985).

Bussiere, et al., Annales De Technologie Agricole, 23, 175–189 (1974).

David, et al., Starke, 39, 436–440 (1987).

*Primary Examiner*—Joseph Golian
*Attorney, Agent, or Firm*—Rockey, Rifkin & Ryther

[57] ABSTRACT

Intermediate temperature stable bacterial alpha-amylase enzymes having an optimum Phadebas activity above 100% at a temperature of about 65° to 72° C. at a pH of about 5.5 to 6.5 and which retain less than 50% of the Phadebas activity at temperatures above about 75° C., when incorporated in the ingredients used to prepare the baked goods, retard the staling of baked goods without causing gumminess or adversely affecting the organoleptic characteristics of the baked goods. Adding an acid stable alpha-amylase enzyme having an optimum activity at a pH of about 3.0 to 5.0 at a temperature of about 60° to 75° C., to the dough with the intermediate temperature stable alpha-amylase enzyme provides synergistic results in making bakery products by reducing the number of activity units necessary and improving the resistance to staling.

17 Claims, 2 Drawing Sheets

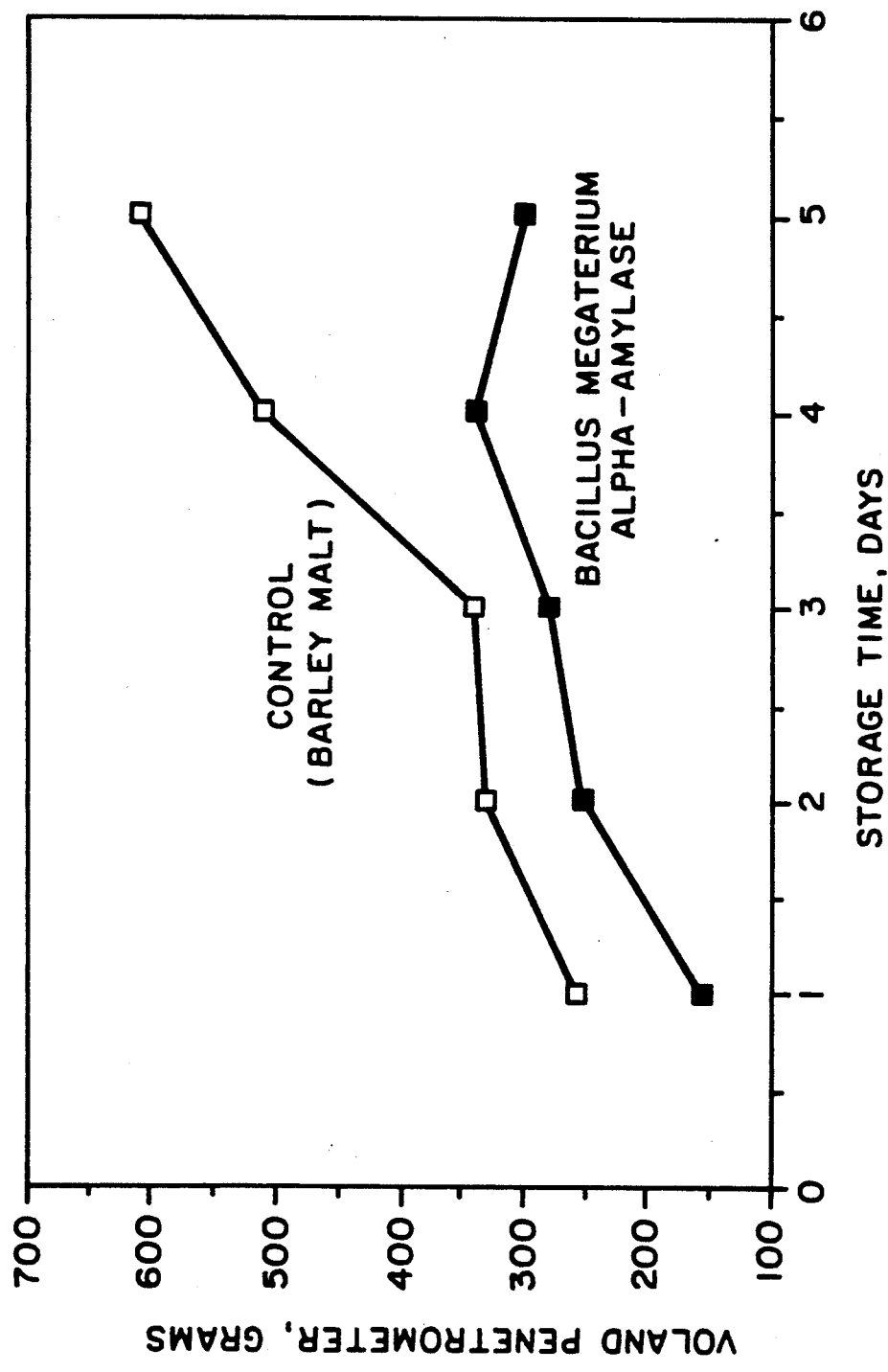
FIG.1 EFFECT OF BACILLUS MEGATERIUM ALPHA-AMYLASE ON BREAD FIRMNESS

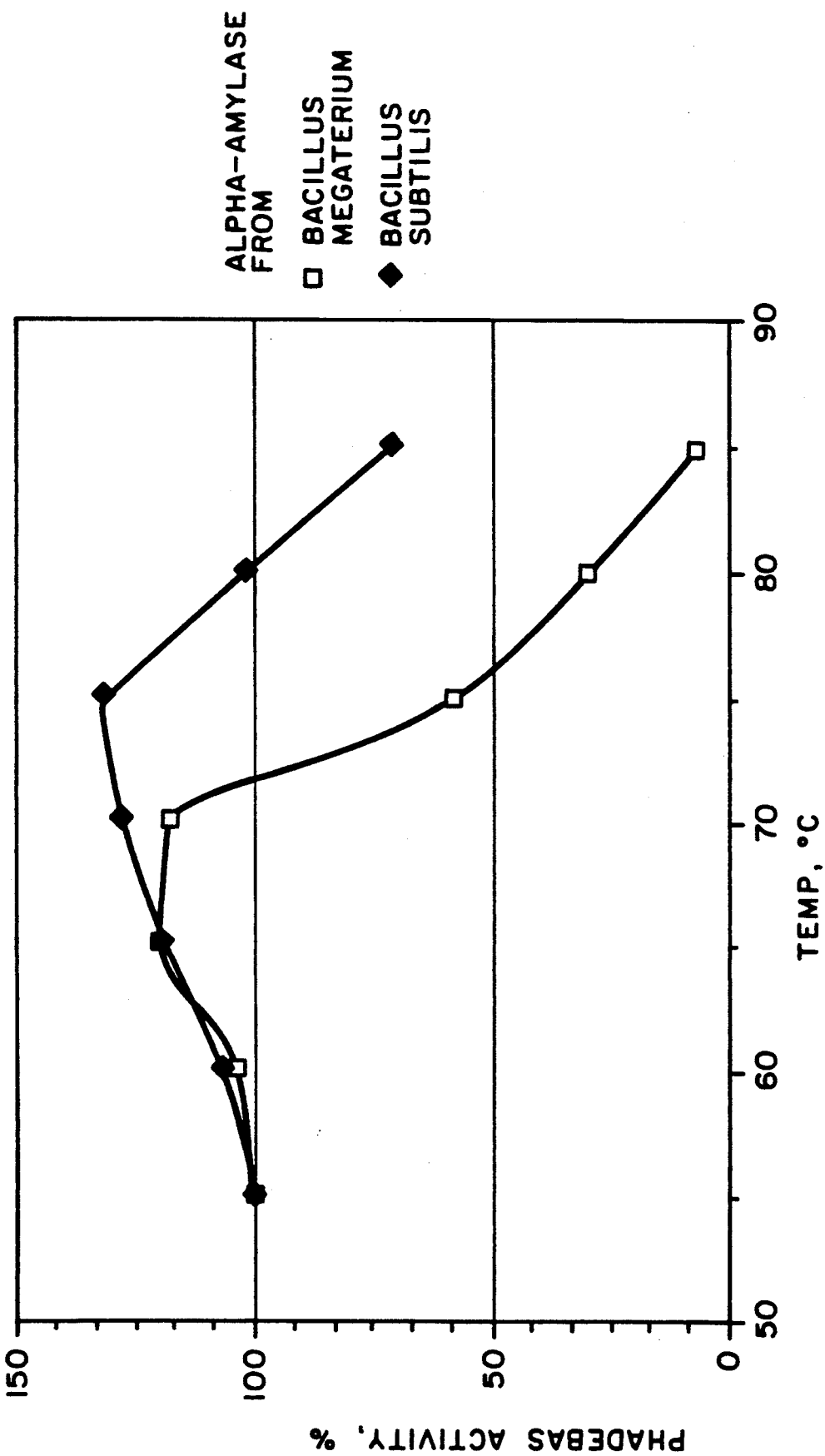
FIG. 2 PHADEBAS ACTIVITY
TEMPERATURE RESPONSE OF BACILLUS MEGATERIUM
AND BACILLUS SUBTILIS ALPHA-AMYLASES

METHOD FOR RETARDING STALING OF BAKED GOODS

BACKGROUND OF THE INVENTION

1. Field of the Invention

This invention relates to the use of certain enzyme compositions which can be incorporated in the ingredients used to prepare baked goods to improve softness and retard staling of the products.

2. Description of the Prior Art

The phenomenon of staling of baked goods is not completely understood. Staling is usually related to the retrogradation of starch, or the association of starch molecules to form areas of crystallinity which result in an increase in firmness of the product with the passage of time. Staling is of considerable economic importance to wholesale bakeries since it limits the shelf life of baked goods in retail outlets to about 3 or 4 days, plus several additional days in the home of the consumer after purchase. The short shelf life of the baked goods has required wholesale bakeries to have separate distribution systems that operate independently of the usual channels for packaged food distribution. In addition, the market area of a bakery is generally limited by the maximum radius the distribution system can cover within 24 hours.

Cereal chemists and bakery technologists have found that various chemical emulsifiers have some influence in extending the shelf life of baked goods, such as bread. However, chemical emulsifiers are only partially effective in reducing bread staling. Monoglycerides and other emulsifiers have been added to bread to improve its softness. Although these emulsifiers produce a softer bread, they have little influence in reducing the rate of bread staling. The term "baked goods" also connotes application to such products as rolls, muffins, biscuits, donuts, crackers and cake.

Enzymes derived from bacterial sources have been used or suggested for use in baked goods for the specific purpose of inhibiting staling.

"Heat stable bacterial alpha-amylase" enzyme as the term is used in the baking and enzyme industries, most often refers to enzymes made from *Bacillus subtilis*, which are used to inhibit staling. The *Bacillus subtilis* enzyme has a Phadebas activity for baking purposes above 100% at temperatures of about 60° to 80° C. at a pH of about 6.2, and retains greater than 50% of its Phadebas activity at temperatures approaching 90° C. All Phadebas values are expressed relative to the value attained at the standard assay temperature of 55° C. This value is considered to be 100% activity. This retention of greater than 50% of its Phadebas activity at temperatures approaching 90° C. causes stickiness and gumminess in baked goods which have employed the *Bacillus subtilis* enzyme in the backing process.

One enzymatic approach to rearding bread staling is disclosed in U.S. Pat. No. 2,615,810 to Stone and involves the use of a heat-stable bacterial alpha-amylase enzyme to attack gelatinized starch granules during baking.

A refinement to Stone's approach is described in U.S. Pat. No. 4,299,848 to DeStefanis et al which discloses a process for the inactivation of the proteolytic enzymes present in commercially available heat stable bacterial alpha-amylase enzyme preparations obtained from extracts of *Bacillus subtilis*, *Bacillus stearothermophilus* or other microbial sources.

In a further refinement, U.S. Pat. No. 4,654,216 to Carroll et al discloses the addition of an enzyme mixture of heat stable bacterial alpha-amylase and a pullulanase to dough in proportions of from 0.25 to 5 SKB (alpha-amylase units) and 5 to 75 PUN (debranching enzyme units) per 100 grams of flour.

G. Bussiere et al in "The Utilization of Alpha-Amylase and Glucoamylase in Industrial Baking Technology", *Annales De Technologie Agricole*, volume 23 (2) pages 175 to 189 (1974) discloses studies on the role of heat stable bacterial alpha-amylases derived from *Bacillus subtilis* in bread making technology. Bussiere et al teaches that heat stable alpha-amylases of bacterial origin are effective in retarding staling, but produce a sticky bakery product when used at a dosage of 2.5 SKB units or more per 100 grams of flour.

A drawback of the Stone, DeStefanis et al, Carroll et al and Bussiere et al approaches is the tendency of heat stable bacterial alpha-amylases to remain active too long during baking and to cause gumminess in the finished product. As a result, these approaches require a degree of control over dosages and enzyme ratios which may be impractical to apply commercially.

An alternative to a heat stable bacterial alpha-amylase is described in Canadian Patent No. 980,703 to Grampp et al which discloses a thermolabile bacterial alpha-amylase without the gumminess causing characteristics of conventional bacterial alpha-amylases. However, Grampp et al does not disclose staling retardation and staling retardation would not be expected with this enzyme because of its thermolability. In terms of stability, the enzyme is similar to traditional fungal amylase which is most active at temperatures of 50°–55° C.

A bacterial alpha-amylase that is distinct from the aforementioned heat stable bacterial alpha-amylases and thermolabile alpha-amylase is derived from *Bacillus megaterium* available as strain NCIB, No. 11568 deposited in the National Collection of Industrial Bacteria, Aberdeen, Scotland. The gene coding for this enzyme has been inserted into plasmids. Microorganisms containing these plasmids and their use to obtain increased yields of the enzyme are disclosed in U.S. Pat. Nos. 4,469,791 and 4,806,426. This enzyme exhibits intermediate temperature stability in relation to the heat stable and thermolabile bacterial alpha-amylases. It is described in an article by David et al in Starch/Starke., Vol. 39, No. 12, pp. 436–440, (1987). However, the use of this enzyme in baked goods has not been heretofore disclosed.

SUMMARY OF THE INVENTION

The present invention is based upon the discovery that intermediate temperature stable bacterial alpha-amylase enzymes retard the staling of baked goods without causing gumminess or adversely affecting the organoleptic characteristics of the baked goods. More specifically, the present invention comprises a process for making baked goods that provide resistance to staling by incorporating in the ingredients used to prepare the baked goods an intermediate temperature stable alpha-amylase enzyme having a maximum Phadebas activity above 100% at a temperature of about 65° to 72° C. at a pH of about 5.5 to 6.5, and yet which retains less than 50% of said Phadebas activity at temperatures above about 75° C.

The use of acid stable alpha-amylase enzyme having an optimum activity at a pH of about 3.0 to 5.0 at a temperature of about 60° to 75° C., in conjunction with the intermediate temperature stable alpha-amylase enzyme provides synergistic results in making bakery products by reducing the number of activity units necessary to improve resistance to staling.

BRIEF DESCRIPTION OF THE DRAWINGS

FIG. 1 is a graph relating bread firmness to storage time when prepared with the inventive enzyme;

FIG. 2 is a graph comparing the Phadebas activity of the *Bacillus megaterium* intermediate temperature stable alpha-amylase with the *Bacillus subtilis* heat stable alpha-amylase.

DESCRIPTION OF THE PREFERRED EMBODIMENTS

In accordance with the present invention, it has been found that the intermediate temperature stable alpha-amylase enzyme retards the staling of baked goods without causing gumminess or adversely affecting the other organoleptic properties of the baked goods.

The intermediate temperature stable enzyme used in this invention has a maximum Phadebas activity above 100% at a temperature of about 65° to 72° C. at a pH of about 5.5 to 6.5, and retains less than 50% of its Phadebas activity at temperatures above about 75° C.

The inventive enzyme survives incorporation in a dough and remains active at temperatures above about 60° C. wherein starch gelatinization occurs. The enzyme is rapidly inactivated at temperatures above about 75° C. which occur later during the baking process and thus has no tendency to excessively hydrolyze starch and cause gumminess in the finished baked goods product. In contrast, the problem of gumminess exists with *Bacillus subtilis* heat stable alpha-amylase because it does not inactivate at 75° C. and retains greater than 50% of its Phadebas activity at temperatures approaching 90° C.

Properties of one *Bacillus megaterium* alpha-amylase enzyme are described in the aforementioned article by M. H. David et al in Starch/Starke, Vol. 39, No. 12, pp. 436–440, (1987). Use of the enzyme for dextrose production is disclosed in U.S. Pat. No. 4,650,757 to M. H. David et al and reported by R. E. Hebeda et al in Starch/Starke, Vol. 40, No. 1, pp. 33–36, (1988).

Activity of the *Bacillus megaterium* alpha-amylase is determined by a Phadebas Dye Release Assay (Pharmacia Diagnostic AB, Uppsala Sweden) as follows. An aqueous solution of the intermediate temperature stable bacterial alpha-amylase is prepared containing an estimated 0.15–0.6 U/ml. Four ml of buffer (0.02M, pH 5.0 acetate buffer in 0.002M CaCl) is added into a conical cetrifuge tube along with one Phadebas Amylase Test tablet (Pharmacia Diagnostic AB, Uppsala Sweden) and incubated at 55° C. for 5 minutes, resulting in a reaction pH of about 6.2. The enzyme solution (0.2 ml) is added to the buffer solution and incubation continued at 55° C. After exactly 15 minutes, 1.0 ml of 0.5M NaOH is added. The reaction mixture is agitated, cooled to room temperature, and centrifuged for ten minutes at 1500 G where G is the force of gravity. Absorbance of the supernate is measured at 620 nm. A blank is carried through in the same manner using water in place of enzyme sample. Units of activity (U) are calculated as follows:

U/g or U/ml = (Abs. of sample − Abs. of blank) × calibration factor × dilution factor The calibration factor is supplied with the test tablets.

In practicing this invention, the intermediate temperature stable bacterial alpha-amylase enzyme is used at a level of from about 1.0 to about 20, preferably about 2.0 to about 10 and most preferably about 3 to about 5 alpha-amylase units per gram of flour.

The alpha-amylase enzyme preparation can be employed as a concentrated aqueous solution or as a solid. In the baking process, the enzyme can be added to either the flour or water during the mixing operation.

In a further embodiment of the invention, it has been found that the combination of an intermediate temperature stable bacterial alpha-amylase derived from *Bacillus megaterium* with an acid stable alpha-amylase derived from *Aspergillus niger* provides synergistic results in retarding the staling of baked goods, with less activity units being necessary and greater retarding of staling being achieved. An acid stable alpha-amylase is described in copending application Ser. No. 419,980, filed Oct. 11, 1989, a continuation of Ser. No. 166,926, filed Mar. 11, 1988 now abandoned.

For example, in the combined use of *Bacillus megaterium* intermediate temperature stable alpha-amylase with *Aspergillus niger* acid stable alpha-amylase to retard staling, the *Bacillus megaterium* intermediate temperature stable alpha-amylase can be used at a level from about 0.5 to 10, preferably about 1 to 7, and most preferably about 2 to 4 alpha-amylase units per gram of flour in combination with the *Aspergillus niger* acid stable alpha-amylase at a level of from about 0.1 to 5, preferably about 0.5 to 3, and most preferably about 1 to 2 alpha-amylase units per gram of flour.

Baked goods prepared in accordance with the process of this invention show improved antistaling properties and remain softer longer as measured by instruments typically used to determine bread softness, such as a Voland Pentrometer or Instron Texture Analyzing Apparatus. Typical improvement in softness is about 10 to 50% after about 1 to 5 days storage. An additional benefit of the enzyme is increased bread loaf volume on the order of about 3 to 5%. The following examples illustrate specific embodiments of the present invention. In the examples and throughout the specification, all parts and percentages are by weight, unless otherwise indicated.

EXAMPLE 1

A plant scale baking trial was conducted using a plain white bread formula and a straight dough process.

Dough batches of 500 pounds were prepared using unmalted flour in the following basic white bread formula:

| Ingredients | Weight Percent |
|---|---|
| Flour | 61.22 |
| Water | 34.07 |
| Yeast | 2.10 |
| Sugar | 1.70 |
| Salt | 0.91 |
| | 100.00 TOTAL |

Megafresh ™ baking carbohydrase available from Enzyme Bio-Systems Ltd., Englewood Cliffs, N.J., an intermediate temperature stable bacterial alpha-amylase derived from *Bacillus megaterium* and having a maximum Phadebas activity above 100% at a pH of about 5.5 to 6.5 at a temperature of about 65° to 72° C., was added at a dosage of 10.9 U/g flour to determine the effect of enzyme on the staling properties of the bread produced. The enzyme was added to 20 pounds of the formula water, mixed, and the solution added to the remainder of the ingredients. As a control, 0.05% barley malt, based on flour, was used in place of the Megafresh TM.

In each case, the dough was held for 5 minutes floor time before being deposited into the hopper of the divider. The dough was then divided, intermediately proofed, sheeted and molded, panned and rolled on racks into a proof box. After the appropriate amount of time, the racks were removed from the proofer and unloaded onto the oven feed conveyor system. The pans traveled through the oven, depanner, cooler, slicer and bagger. Samples for shelf life studies were stored at room temperature.

Freshness tests were determined by means of a Voland Penetrometer (Voland Company, Hawthorne, N.Y.), having a 1 inch flat probe (Voland designation-TA 11). Each of the loaves was sliced into uniform segments. Each segment was placed in the penetrometer set for 5 millimeter penetration at a speed of 2 millimeters per second. The procedure was consistent with that disclosed in an article by Baker et al "Comparison of Bread Firmness Measurements by Four Instruments" in CEREAL FOODS WORLD, pages 486 to 489, vol. 32, No. 7, (July 1987). The test results for each of the slices of bread produced from the various doughs are given in Table 1 which follows:

TABLE 1

| | Voland Penetrometer Load (Grams) (a) | | |
|---|---|---|---|
| Storage Time, Days | Control (Barley Malt) | Megafresh TM 10.9 U/g Flour | Reduction in Firmness, % |
| 1 | 258 ± 37 | 155 ± 47 | 40 |
| 2 | 331 ± 121 | 253 ± 142 | 24 |
| 3 | 342 ± 124 | 280 ± 75 | 18 |
| 4 | 510 ± 106 | 339 ± 74 | 34 |
| 5 | 610 ± 96 | 298 ± 85 | 51 |

(a): Average of 15 determinations.

As can be seen from the data which has been plotted in the graph on FIG. 1, firmness of the bread prepared with Megafresh TM is reduced by as much as 51% when compared with the barley malt control.

EXAMPLE 2

The procedure of Example 1 was repeated using a combination of Megafresh TM baking carbohydrase, an intermediate temperature stable bacterial alpha-amylase derived from *Bacillus megaterium* and having a maximum Phadebas activity above 100% at a pH of about 5.5 to 6.5 at a temperature of about 65° to 72° C., and Multifresh TM baking carbohydrase, commercially available from Enzyme Bio-System Ltd., Englewood Cliffs, N.J., an acid stable alpha-amylase derived from *Aspergillus niger* having an optimum activity at a pH of about 3.0 to 5.0 at a temperature of about 60° to 75° C. A Megafresh TM dosage of 4.8 U/g of flour was used in combination with 2.7 U/g flour Multifresh TM.

TABLE 2

| | Voland Penetrometer Load (Grams) (a) | | |
|---|---|---|---|
| Storage Time, Days | Control (Malt) | Megafresh TM Multifresh TM Combination | Reduction in Firmness, % |
| 1 | 258 ± 37 | 100 ± 22 | 61 |
| 2 | 331 ± 121 | 186 ± 47 | 44 |
| 3 | 343 ± 124 | 177 ± 65 | 48 |
| 4 | 510 ± 106 | 183 ± 61 | 64 |
| 5 | 610 ± 96 | 188 ± 68 | 69 |

(a): Average of 15 determinations.

The combination of enzymes reduced bread firmness by as much as 69% compared to the control after 5 days storage.

EXAMPLE 3

A laboratory trial was conducted using a white pan bread formula and a sponge-dough process. The mixer was a Hobart A-200 Mixer with 20 quart bowl and dough hook. The formula and processing parameters were as follows:

| White Pan Bread Control Formula | |
|---|---|
| Ingredients | Grams |
| SPONGE: | |
| Bread Flour | 2100 |
| Mineral Yeast Food | 6 |
| Compressed Yeast | 60 |
| Water | 1260 |
| DOUGH: | |
| Bread Flour | 900 |
| Granulated Sugar | 180 |
| Nonfat Dry Milk | 60 |
| Salt | 60 |
| All-Purpose Shortening | 90 |
| Crumb Softener GMS-90 | 30 |
| Water and Ice (Variable) | 570 |
| Total Weight (Yields 9-10 Loaves) | 5316 |

| Processing Conditions | | |
|---|---|---|
| | SPONGE | DOUGH |
| Desired Temperature: | 76°-77° F. | 78°-80° F. |
| Fermentation Time: | 3.25 Hours | 10 Minutes |
| Scaling Weight: | 526 grams Dough per loaf | |
| Proof: | To Average Total Height of 100 ± 1 mm | |
| Bake: | 16 Minutes at 450° F. | |
| Cool: | One Hour at Ambient Temperature | |

Three tests were made using 2.6, 5.1, or 10 U/g flour Megafresh TM. In each case, the enzyme was added to a portion of the water used for the dough, mixed and added to the remainder of the ingredients. The dough was processed and bread loaves prepared as above. A control test was made without the addition of Megafresh TM. Each loaf was packaged in two polyethylene bread bags and stored in an environmental cabinet at 77° F. (25° C.) until withdrawn for evaluation after 3, 7, and 11 days. At each time, 3 loaves from each test were evaluated in replicate (5 measurements per loaf) for crumb firmness using the Instron Texture Analyzing Apparatus by the method described by Baker and Ponte in *Cereal Foods World*, Vol. 32, No. 7, pp 491-493, (July, 1987). Results of these tests are given in Table 3 as follows:

TABLE 3

| Storage Time, Days | Instron Texture Analyzing Apparatus (grams) (a) | | | |
|---|---|---|---|---|
| | Control | Megafresh TM, U/g Flour | | |
| | | 2.6 | 5.1 | 10 |
| 3 | 219 ± 3 | 208 ± 3 | 179 ± 2 | 188 ± 3 |
| 7 | 320 ± 4 | 277 ± 2 | 256 ± 5 | 260 ± 3 |
| 11 | 403 ± 8 | 361 ± 5 | 331 ± 6 | 346 ± 8 |

(a): Average of 15 determinations.

The addition of Megafresh TM to the dough resulted in improved freshness compared to the control. For instance, with the intermediate dosage of Megafresh TM (5.1 U/g flour), firmness after 3, 7, and 11 days was 18–20% less than the control values.

EXAMPLE 4

A laboratory trial was conducted in the same manner as described in Example 3. The formula and processing conditions were as follows:

| White Pan Bread Control Formula | |
|---|---|
| Ingredients | Grams |
| SPONGE: | |
| Bread Flour | 2100 |
| Mineral Yeast Food, Bromated | 3 |
| Sodium Stearoyl Lactylate | 11.2 |
| Compressed Yeast | 75 |
| Water | 1260 |
| DOUGH: | |
| Bread Flour | 900 |
| Nonfat Dry Milk | 60 |
| Salt | 60 |
| Calcium Proplonate | 3 |
| Crumb Softener GMS-90 | 30 |
| Soybean Oil | 60 |
| 42% High Fructose Corn Syrup | 255 |
| Water and Ice | 526 |
| Total Weight (Yields 9-10 Loaves) | 5343.2 |

| Processing Conditions | | |
|---|---|---|
| | SPONGE | DOUGH |
| Desired Temperature: | 76° F. | 78 ± 1° F. |
| Fermentation Time: | 3.25 Hours | 10 Minutes |
| Scaling Weight: | 526 grams Dough per loaf | |
| Proof: | To Average Total Height of 100 ± 1 mm. | |
| Bake: | 18 Minutes at 435° F. | |
| Cool: | One Hour at Ambient Temperature | |

Three tests were made using 1.3, 2.6, or 5.1 Megafresh TM U/g total flour. In each case, the enzyme was added to a portion of the water used for the sponge, mixed and added t the remainder of the ingredients. The sponge was prepared, the dough processed and bread loaves prepared as above. A control test was made without the addition of Megafresh TM. Each loaf was tested as described in Example 3. Results of these tests are given in Table 4 as follows:

TABLE 4

| Storage Time, Days | Instron Texture Analyzing Apparatus (grams) (a) | | | |
|---|---|---|---|---|
| | Control | Megafresh TM, U/g Flour | | |
| | | 1.3 | 2.6 | 5.1 |
| 1 | 134 ± 3 | 113 ± 2 | 110 ± 2 | 115 ± 2 |
| 4 | 201 ± 5 | 174 ± 4 | 178 ± 3 | 183 ± 3 |
| 7 | 249 ± 5 | 216 ± 4 | 209 ± 11 | 215 ± 3 |

(a): Average of 15 determinations.

The addition of Megafresh TM to the sponge resulted in improved freshness compared to the control. For instance, with Megafresh TM dosages of 1.3, 2.6 and 5.1 U/g flour, bread firmness after 4 days was 13, 11 and 9%, respectively, less than the control value.

An additional test was made using a Megafresh TM dosage 0.6 U/g of flour in combination with 0.3 U/g of flour of Multifresh TM. The bread firmness after 4 and 7 days was 16% and 20%, respectively, less than the control value.

These tests show that when intermediate temperature stable bacterial alpha-amylase is incorporated in the sponge in a sponge-dough process, it retards bread staling. They also show that this retarding of bread staling can be accomplished by very small amounts of the intermediate temperature stable bacterial alpha-amylase enzyme when it is used in combination with an acid stable microbial alpha-amylase enzyme.

EXAMPLE 5

A comparison of Phadebas activity of *Bacillus megaterium* intermediate temperature stable alpha-amylase and *Bacillus subtilis* heat stable alpha-amylase at conditions of 6.2 pH, varied temperature and 15 minutes reaction time provided the following results tabulated as follows and plotted in FIG. 2. Phadebas activity determined at the standard assay temperature of 55° C. was expressed as 100% activity. Values at other temperatures were expressed relative to the value determined at 55° C.

| °C. | PHADEBAS % ACTIVITY | |
|---|---|---|
| | *Bacillus meaterium* | *Bacillus subtilis* |
| 55 | 100 | 100 |
| 60 | 103 | 106 |
| 65 | 119 | 118 |
| 70 | 118 | 127 |
| 75 | 58 | 131 |
| 80 | 30 | 101 |
| 85 | 7 | 72 |

What is claimed is:

1. In a process for retarding the staling of baked goods by incorporating an enzyme in the ingredients used to prepare the baked goods, the improvement which comprises incorporating in the ingredients an enzyme derived from *Bacillus megaterium* which has a Phadebas activity above 100% at a temperature of about 65° to 72° C. at a pH of about 5.5 to 6.5 and retains less than 50% of said Phadebas activity at a temperature above about 70° C.

2. The process of claim 1, wherein the *Bacillus megaterium* is *Bacillus megaterium* NCIB No. 11568.

3. The process of claim 1, wherein the enzyme is used at a level of from about 1.0 to about 20 alpha-amylase units per gram of flour.

4. The process of claim 3, wherein the enzyme level varies from about 2.0 to about 10 alpha-amylase units per gram of flour.

5. The process of claim 4, wherein the enzyme level varies from about 3 to about 5 alpha-amylase units per gram of flour.

6. The process of claim 3, wherein the baked goods experience an improvement in softness of about 10 to 50% after about 1 to 5 days.

7. The process of claim 1, wherein the use of said enzyme reduces or eliminates the addition of dough conditioners, and/or softening agents.

8. The process of claim 1, wherein the baked goods is bread.

9. The process of claim 8, wherein the enzyme is incorporated in the bread dough.

10. The process of claim 8, wherein the enzyme is incorporated in the sponge in a sponge-dough process.

11. The process of claim 8, wherein the bread experiences an increase in loaf volume of about 3% to 5%.

12. The process of claim 1 which further comprises incorporating in the ingredients an acid stable microbial alpha-amylase enzyme derived from *Aspergillus niger*.

13. The process of claim 12, wherein the activity of the *Bacillus megaterium* enzyme varies from about 0.5 to 10 alpha-amylase units per gram of flour and the activity of the *Aspergillus niger* acid stable alpha-amylase varies from about 0.1 to 5 alpha-amylase units per gram of flour.

14. The process of claim 13, wherein the activity of the *Bacillus megaterium* enzyme varies from about 1 to 7 alpha-amylase units per gram of flour and the activity of the *Aspergillus niger* acid stable alpha-amylase varies from about 0.5 to 3 alpha-amylase units per gram of flour.

15. The process of claim 14, wherein the activity of the *Bacillus megaterium* enzyme varies from about 2 to 4 alpha-amylase units per gram of flour and the activity of the *Aspergillus niger* acid stable alpha-amylase varies from about 1 to 2 alpha-amylase units per gram of flour.

16. The process of claim 9, wherein the enzyme derived from *Bacillus megaterium* is used in conjunction with an acid stable microbial alpha-amylase enzyme derived from *Aspergillus niger*.

17. The process of claim 10, wherein the enzyme derived from *Bacillus megaterium* is used in conjunction with an acid stable microbial alpha-amylase enzyme derived from *Aspergillus niger*.

* * * * *